United States Patent
Yuan et al.

(10) Patent No.: US 7,515,608 B2
(45) Date of Patent: Apr. 7, 2009

(54) METHODS AND MEDIA ACCESS CONTROLLER FOR MESH NETWORKS WITH ADAPTIVE QUALITY-OF-SERVICE MANAGEMENT

(75) Inventors: Yuan Yuan, Greenbelt, MD (US); Luiyang Lily Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 896 days.

(21) Appl. No.: 11/030,601

(22) Filed: Jan. 4, 2005

(65) Prior Publication Data

US 2006/0146874 A1 Jul. 6, 2006

(51) Int. Cl.
*H04J 3/16* (2006.01)
(52) U.S. Cl. ...................................... 370/468
(58) Field of Classification Search ................ 370/468, 370/252, 229, 230, 230.1, 329, 224, 409, 370/331, 356, 338, 389, 235, 233, 234, 236, 370/253, 477; 455/405, 404.2, 452.1, 452.2; 709/229, 224, 200; 700/109, 108, 100
See application file for complete search history.

(56) References Cited

U.S. PATENT DOCUMENTS

| | | | |
|---|---|---|---|
| 6,631,118 B1 * | 10/2003 | Jones | 370/252 |
| 7,068,624 B1 * | 6/2006 | Dantu et al. | 370/331 |
| 7,212,491 B2 * | 5/2007 | Koga | 370/229 |
| 7,289,453 B2 * | 10/2007 | Riedel et al. | 370/252 |
| 2003/0053469 A1 | 3/2003 | Wentink | |
| 2005/0135403 A1 * | 6/2005 | Ketchum et al. | 370/437 |

OTHER PUBLICATIONS

"International Search Report for corresponding PCT Application No. PCT/US2006/000481", (Jun. 7, 2006), 4 pgs.
Scarpa, V., et al., "Adaptive Techniques to Guarantee Qos in a IEEE 802.11 Wireless Lan", *Vehicular Technology Conference, IEEE, vol. 5*, (May 17, 2003),3014-3018.
Zhu, H., et al., "EDCF-DM: A Novel Enhanced Distributed Coordination Function for Wireless Ad Hoe Networks", *IEEE Communications Society, vol. 7*, (Jun. 20, 2004), 3886-3890.

* cited by examiner

*Primary Examiner*—Chi H Pham
*Assistant Examiner*—Alexander Boakye
(74) *Attorney, Agent, or Firm*—Schwegman, Lundberg & Woessner, P.A.; Gergory J. Gorrie

(57) ABSTRACT

A media access controller (MAC) for wireless mesh networks comprises a quality-of-service (QoS) manager to monitor consumed bandwidth of a current application flow and to compare the consumed bandwidth with a contracted bandwidth for the current application flow. The MAC also comprises a contention manager to coordinate access to a wireless communication channel for communications with other nodes of the wireless mesh network. The QoS manager instructs the contention manager to employ signaling to request additional resources for the current application flow after the consumed bandwidth is significantly less than the contracted bandwidth.

39 Claims, 3 Drawing Sheets

METHODS AND MEDIA ACCESS CONTROLLER FOR MESH NETWORKS WITH ADAPTIVE QUALITY-OF-SERVICE MANAGEMENT

TECHNICAL FIELD

Embodiments of the present invention pertain to wireless communications. Some embodiments of the present invention relate to mesh networks, and some embodiments relate to media access control.

BACKGROUND

Wireless mesh networks, including digital home networks, may include several wireless communication nodes that transfer and route communications for different applications therebetween. These communications may be associated with a particular application flow that may have a contracted (i.e., requested) quality-of-service (QoS) level requirement. Examples of higher QoS level application flows include high-definition television (HDTV) flows, standard television (SDTV) flows, streaming video flows and voice flows. One problem with conventional mesh networks is that lower QoS level application flows, such as background and best effort flows, may negatively affect higher QoS level flows because access to the transmission medium is not effectively managed resulting in bursty arrival patterns at receiving nodes of the network.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to voluntarily limit the scope of this application to any single invention or inventive concept if more than one is in fact disclosed.

Figure 1A:
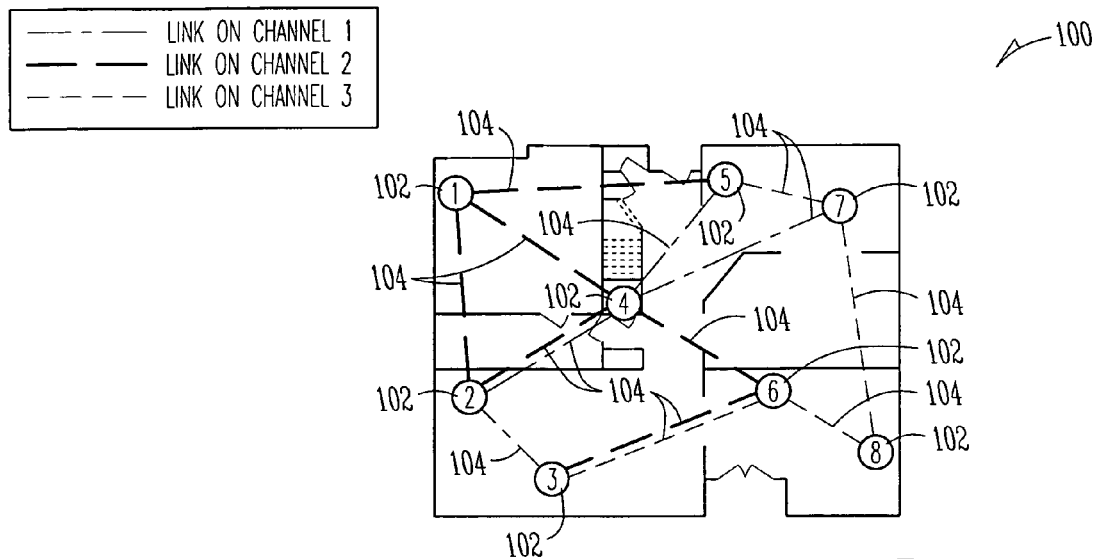
FIG. 1A illustrates a wireless mesh network in accordance with some embodiments of the present invention.

FIG. 1A illustrates a wireless mesh network in accordance with some embodiments of the present invention. Wireless mesh network 100 may comprise a plurality of wireless communication nodes 102 that may communicate with each other over one or more wireless communication channels 104. In some embodiments, at least some of wireless communication nodes 102 communicate with other nodes 102 using more than one wireless communication channel 104. In some embodiments, some wireless communication nodes 102 communicate with other nodes 102 using only one communication channel. Although wireless mesh network 100 is illustrated as a multichannel mesh network, the scope of the invention is not limited in this respect.

In wireless mesh network 100, transmissions that comprise an application flow may traverse multiple nodes 102 (i.e., multiple hops) and nodes 102 may contend for the shared resources of wireless communication channels 104. In accordance with some embodiments of the present invention, nodes 102 may implement a resource management technique to coordinate allocation of the wireless channel for more than one application flow over multiple hops. Furthermore, in some embodiments, nodes 102 may implement admission control techniques to help prevent different priority applications from interfering with each other. In some of these embodiments, a resource adaptation management process may help resolve conflicts by trading off performance of lower-priority application flows. This is discussed in more detail below.

Figure 1B:
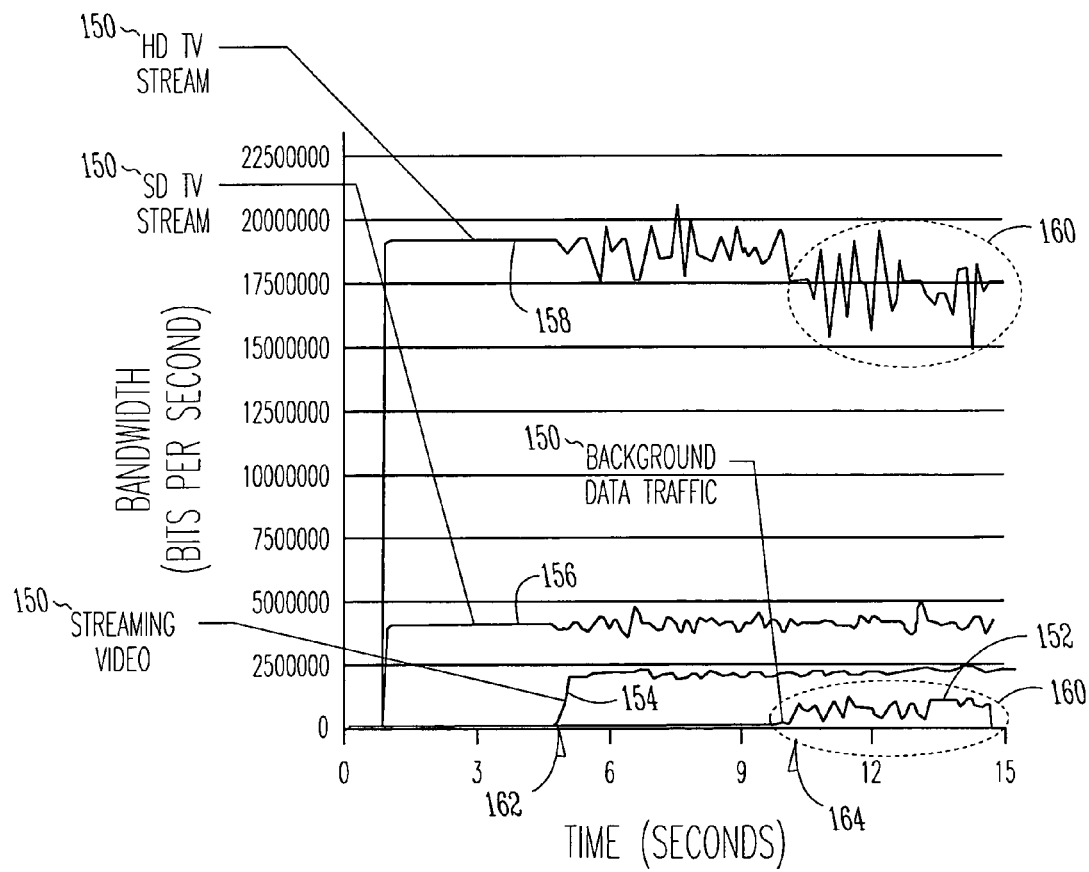
FIG. 1B illustrates the effects of lower quality-of-service (QoS) level application flows on higher QoS level multimedia application flows.

FIG. 1B illustrates the effects of lower quality-of-service (QoS) level application flows on higher QoS level multimedia application flows. FIG. 1B illustrates the data rate in bits-per-second of several of application flows 150 as a function of time. Application flows 150 may be communicated over the same channel between one or more nodes of a conventional wireless mesh network. Application flows 150 may include higher QoS level application flows such as high-definition television (HDTV) application flow 158, standard television (SDTV) application flow 156, and streaming video application flow 154. Application flows 150 may also include lower QoS level application flows such as background data traffic application flow 152.

In a conventional wireless mesh network, streaming video application flow 154 begins to affect both HDTV application flow 158 and SDTV application flow 156 when its transmissions begin at time 162. In a conventional wireless mesh network, background data traffic application flow 152 begins to significantly affect HDTV application flow 158 when its transmissions begin at time 164 and continue during transmission time 160. In accordance with some embodiments of the present invention, the effects of the lower QoS level application flows on the higher QoS level may be mitigated through adaptive QoS management operations as described in more detail below. Although high QoS level application flows are illustrated in FIG. 1B as streamed flows, the scope of the invention is not limited in this respect.

Figure 2:
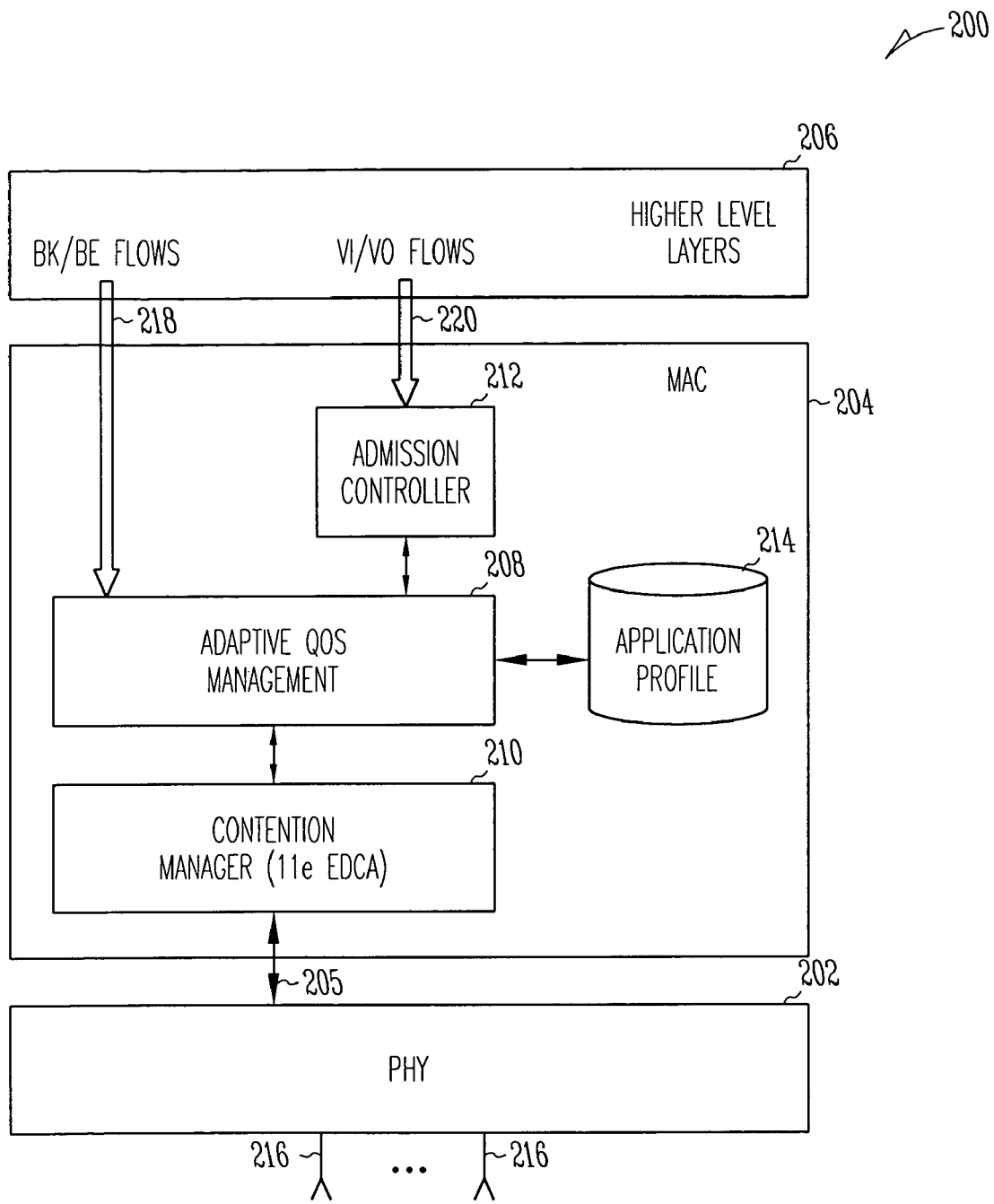
FIG. 2 is a block diagram of a wireless communication device in accordance with some embodiments of the present invention.

FIG. 2 is a block diagram of a wireless communication device in accordance with some embodiments of the present invention. Wireless communication device 200 may be suitable for use a node, such as one or more of nodes 102 (FIG. 1A), in a wireless mesh network, although the scope of the invention is not limited in this respect. In some embodiments, wireless communication device 200 may be a wireless mesh network router, although the scope of the invention is not limited in this respect.

Wireless communication device 200 may include one or more layers of a protocol stack including physical (PHY) layer 202, media access control (MAC) layer 204 and higher-level layers 206. Higher-level layers 206 may provide application flows 218 and 220 to media access control layer 204. Media access control layer 204 may coordinate access to a communication channel and generate MAC data 205 (e.g., MAC packet data units) for transmission to other nodes of a mesh network using physical layer 202.

In accordance with some embodiments of the present invention, media access control layer 204 may include quality-of-service (QoS) manager 208 to monitor a consumed bandwidth of a current application flow and to compare the consumed bandwidth with a contracted bandwidth for the current application flow. Media access control layer 204 may also include contention manager 210 to coordinate access to a wireless communication channel (i.e., the transmission medium) for communications with other nodes of the wireless mesh network. In these embodiments, QoS manager 208 may instruct contention manager 210 to employ signaling to request additional resources for a current application flow after the consumed bandwidth of the current application flow is significantly less than the contracted bandwidth.

The contracted bandwidth may refer to the amount of channel resource that an application flow is suited to use and may be provided when a service flow is admitted to a node. When an application flow operates within range of its contracted bandwidth, it should meet its "contracted" QoS requirement. In other words, an HDTV flow will provide an acceptable HDTV picture, for example, and SDTV flow with provide an acceptable SDTV picture, for example. When the consumed bandwidth of the current application flow is significantly less than the contracted bandwidth, the current application flow may not be receiving enough of the channel resource to satisfy its requirement. This may be because low-priority application flows are consuming too much bandwidth, that channel capacity has degraded due to a decreased signal-to-noise ratio, or that other multimedia applications have violated their QoS contracts and are using more bandwidth than necessary.

In some embodiments, in response to the request for additional resources, a contention manager of a transmitting node receiving the request for additional channel resources may increase a contention window for a lower quality-of-service level application flow. The transmitting node may be one of the other nodes of the wireless mesh network transmitting the current application flow to the current node. In some embodiments, the contention manager of a transmitted node may significantly increase or double its contention window to reduce the bandwidth for one or more lower quality-of-service level application flows providing additional bandwidth for a higher quality-of-service level application flow to use.

In some embodiments, the signaling employed by contention manager 210 may include setting a flag bit in reply packets to request one or more transmitting nodes to allocate greater bandwidth to the current application, although the scope of the invention is not limited in this respect. In some embodiments, the flag bit may be set (e.g., set to one) in request-to-send (RTS) packets or clear-to-send (CTS) packets, while in other embodiments, a flag bit may be set in a data packet header, although the scope of the invention is not limited in this respect.

Some embodiments may include resetting the contention window. In these embodiments, contention manager 210 of the current node (e.g., wireless communication device 200) may employ signaling to instruct the transmitting node to reset the contention window after the consumed bandwidth is no longer significantly less than the contracted bandwidth. In some embodiments, the flag bit may be reset (e.g., set to zero) indicating that the current application is no longer receiving significantly less than the contracted bandwidth. The contention manager of the transmitting node may slowly decrease or reset the contention window for lower quality-of-service level application flows allowing them to increase their bandwidth usage.

In some embodiments, contention manager 210 of the current node may be responsive to requests from one or more of the other nodes of the wireless mesh network for additional resources for an application flow. In these embodiments, contention manager 210 may increase a contention window for a lower quality-of-service level application flow in response to the requests.

In some embodiments, one or more service flows may be terminated at the current node based on their profile. In these embodiments, quality-of-service manager 208 of the current node may terminate one or more of the lower quality-of-service level application flows after the consumed bandwidth remains significantly less than the contracted bandwidth for a current higher QoS level application flow even after the contention manager of the transmitting node has increased the contention window for the one or more lower quality-of-service level application flows. In some embodiments, quality-of-service manager 208 may select one or more lower quality-of-service level application flows 218 for termination based on application profile 214. Application profile 214 may indicate a priority of an associated application flow.

In some embodiments, a current application flow may be one of a plurality of higher QoS level application flows 220. Higher quality-of-service level application flows 220 may comprise one or more of a voice (VO) application flow or a video (VI) application flow. Examples of higher QoS level flows 220 may include multimedia application flows such as a high-definition television (HDTV) application flow, a standard television (SDTV) application flow, a streaming video application flow and a voice application flow. Lower quality-of-service level application flows 218 may comprise background (BK) and best effort (BE) application flows, such as an email application flow, an Internet application flow, a file transfer protocol (FTP) application flow, a transmission control protocol (TCP) application flow and a universal datagram protocol (UDP) application flow, although the scope of the invention is not limited in this respect. In some embodiments, the priority of an application flow may be determined from the application flow's QoS requirements. Alternatively, in some embodiments, a user may select the priority of the application flows. The priority may be stored with application profiles 214. For example, HDTV may be a higher priority application flow than SDTV, and SDTV may be a higher priority application flow than streaming video, etc., although the scope of the invention is not limited in this respect.

In some embodiments, QoS manager 208 may instruct contention manager 210 to either allocate additional bandwidth to lower quality-of-service level application flows or delay transmissions of the current application flow after the consumed bandwidth is significantly greater than the contracted bandwidth.

When the consumed bandwidth is significantly greater than the contracted bandwidth, an application flow is consuming too much of the channel resource, which may be much more than it needs. This may also mean the application flow may be aggressive or is misbehaving and may potentially affect the performance of other application flows. Reducing the bandwidth consumed by these application flows should not degrade their performance. In some embodiments, contention manager 210 may increase a contention window for a current application to delay transmissions of the current application flow after the consumed bandwidth is significantly greater than the contracted bandwidth.

In some embodiments, contention manager 210 may communicate with physical layer 206. In some of these embodiments, physical layer 206 may communicate orthogonal frequency division multiplexed (OFDM) communication signals with one or more of the other nodes of a wireless mesh network, although the scope of the invention is not limited in this respect. The orthogonal frequency division multiplexed communication signals may comprise a plurality of closely spaced substantially orthogonal subcarriers, although the scope of the invention is not limited in this respect.

To help achieve orthogonality between the closely spaced subcarriers of an OFDM signal, each subcarrier may have a null at substantially a center frequency of the other subcarriers. In some embodiments, to help achieve orthogonality between the closely spaced subcarriers of an OFDM signal, each subcarrier may have an integer number of cycles within a symbol period.

In some embodiments, wireless communication device 200 may be multichannel node and may communication in a multichannel mesh network. In these embodiments, physical layer 206 may have two or more transceivers and may communicate with at least some of the other nodes of the mesh network with two or more orthogonal communication channels, although the scope of the invention is not limited in this respect. In some multiple-input multiple-output (MIMO) embodiments, physical layer 206 may be coupled to two or more antennas 216 for simultaneously transmitting and/or receiving two or more data streams to one or more of the other nodes of the wireless mesh network, although the scope of the invention is not limited in this respect. Antennas 216 may comprise one or more directional or omnidirectional antennas, including, for example, dipole antennas, monopole antennas, patch antennas, loop antennas, microstrip antennas or other types of antennas suitable for reception and/or transmission of RF signals by device 200.

In some embodiments, contention manager 210 may perform an enhanced distributed coordinated access (EDCA) procedure to access a wireless communication channel (i.e., the transmission medium). An increase in the contention window by contention manager 210 may increase a back-off time for transmissions by physical layer 206 which may change a probability of gaining access to the channel. In some embodiments, increasing the back-off time may delay transmissions resulting in reduced bandwidth consumption. The contention window may be viewed as an amount of delay before a data packet is transmitted to another node. In some embodiments, the contention window may be viewed as an amount of delay before a previously transmitted data packet is retransmitted to another node after the initial transmission results in collisions with transmissions from other nodes. A variable contention window changes the probability of subsequent collisions. In accordance with some embodiments of the present invention, increasing the contention window may also reduce the bandwidth consumed by the application flow.

In some embodiments, media access controller 104 may include admission controller 212 to admit one or more of application flows 218 and 220 to the network and provide a contracted bandwidth for each admitted application flow to quality-of-service manager 208. In some embodiments, the admission of application flows may be based on the available bandwidth, although the scope of the invention is not limited in this respect. In some embodiments, admission control for application flows may be distributed across the mesh network, although the scope of the invention is not limited in this respect. In these embodiments, application flows may be admitted at a network level.

Although wireless communication device 200 is illustrated as having several separate functional elements, one or more of the functional elements may be combined and may be implemented by combinations of software-configured elements, such as processing elements including digital signal processors (DSPs), and/or other hardware elements. For example, processing elements may comprise one or more microprocessors, DSPs, application specific integrated circuits (ASICs), and combinations of various hardware and logic circuitry for performing at least the functions described herein. In some embodiments, the functional elements of device 200 may refer to one or more processes operating on one or more processing elements.

Figure 3:
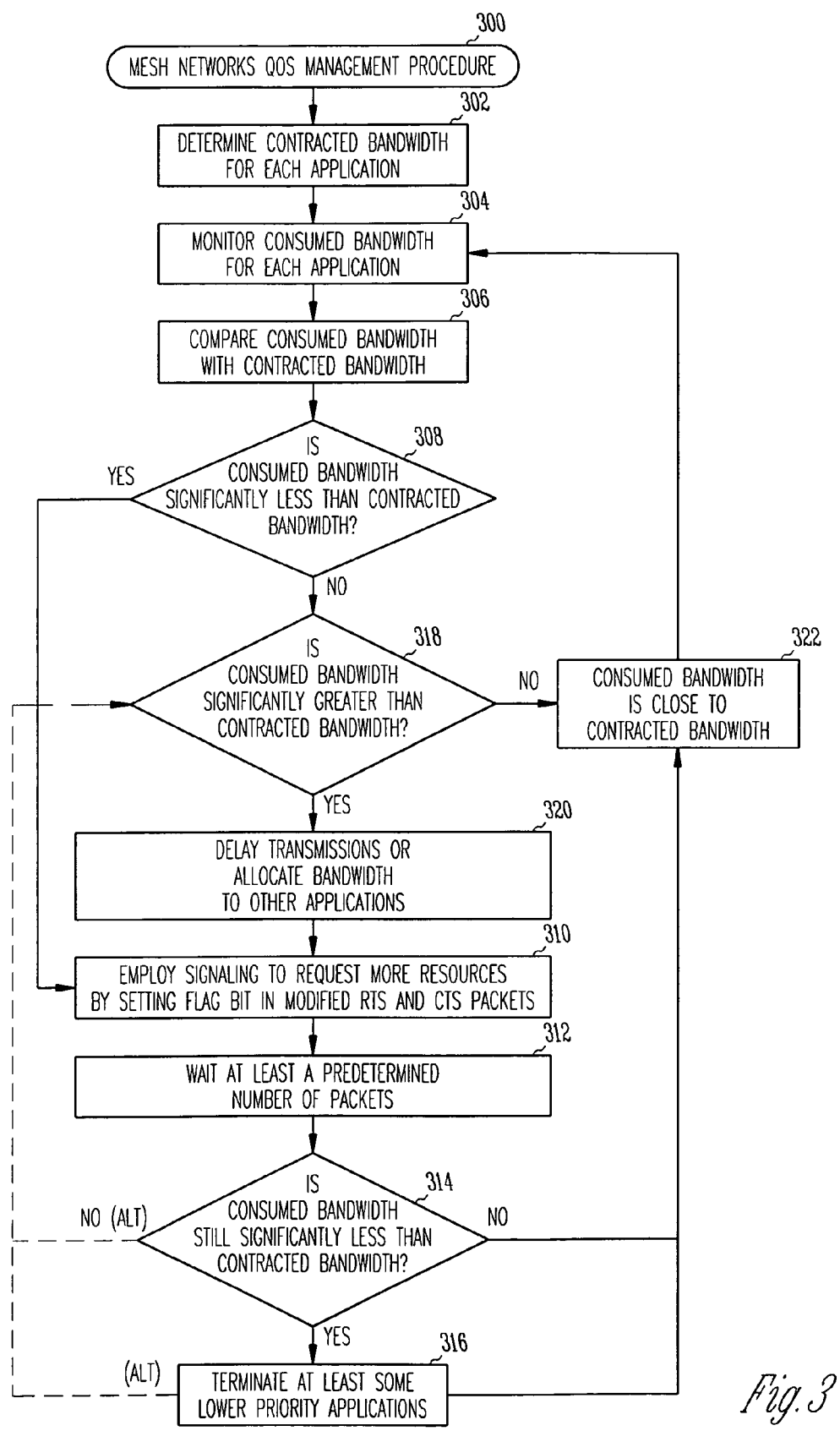
FIG. 3 is a flow chart of a mesh network quality-of-service (QoS) management procedure in accordance with some embodiments of the present invention.

FIG. 3 is a flow chart of a mesh network quality-of-service (QoS) management procedure in accordance with some embodiments of the present invention. Mesh network QoS management procedure 300 may be performed by a node of a mesh network, such as node 200 (FIG. 2) when operating in wireless mesh network 100 (FIG. 1). In some embodiments, mesh network QoS management procedure 300 may be performed by every node of a mesh network, although the scope of the invention is not limited in this respect. The performance of procedure 300 may allow a node to manage the QoS level of admitted application flows by providing a distributed coordination of QoS management, by managing multi-hop contention and/or by managing resource conflict. In some embodiments, procedure 300 may be performed concurrently for each application flow admitted to the network by a node operating as a router in the network.

Operation 302 comprises determining the contracted bandwidth for each admitted application flow. Operation 302 may also comprise admitting one or more application flows at the node. In some embodiments, the contracted bandwidth may be provided by another node of the network or may be known from the application flow itself (i.e., the type of flow), although the scope of the invention is not limited in this respect.

Operation 304 comprises monitoring the consumed bandwidth for each application flow. In some embodiments, operation 304 may be performed by QoS manager 208 (FIG. 2), although the scope of the invention is not limited in this respect. In some embodiments, a node may monitor the bandwidth actually allocated (i.e., used) to each application flow.

Operation 306 comprises comparing the consumed bandwidth with the contracted bandwidth for a particular admitted application flow.

Operation 308 comprises determining when the consumed bandwidth is significantly less than the contracted bandwidth for a particular admitted application flow. When the consumed bandwidth is significantly less than the contracted bandwidth, operation 310 is performed. When the consumed bandwidth is not significantly less than the contracted bandwidth, operation 318 may be performed.

Operation 310 comprises employing signaling to request additional resources from one or more transmitting nodes (e.g., the one or more nodes of the network that are transmitting the application flow in a multihop path to the current node). In some embodiments, a flag bit may be set in reply packets indicating a request for additional bandwidth, although the scope of the invention is not limited in this respect.

Operation 312 comprises waiting at least a predetermined number of packet transmissions before operation 314 determines whether the consumed bandwidth is still significantly less than the contracted bandwidth. If the consumed bandwidth is still significantly less than the contracted bandwidth, operation 316 may be performed. If the consumed bandwidth is not significantly less than the contracted bandwidth, status block 322 may indicate that the consumed bandwidth may be within range of the contracted bandwidth. In some alternate embodiments, when the consumed bandwidth is not significantly less than the contracted bandwidth, operation 318 may be performed.

Operation 316 comprises terminating at least one or more lower priority application flows. In some embodiments, operation 316 may terminate lower priority application flows until the consumed bandwidth is no longer significantly less than the contracted bandwidth. In some embodiments, when a node terminates an application flow, packets belonging to the terminated application flow may be dropped. In some embodiments, the node may signal the source node, which may be a different node, to refrain from injecting the application flow into the network, although the scope of the invention is not limited in this respect. Upon the completion of operation 316, status block 322 may indicate that the consumed bandwidth may be within range of the contracted bandwidth. In some alternate embodiments, upon the completion of operation 316, operation 318 may be performed.

Operation 318 comprises determining when the consumed bandwidth for an application flow is significantly greater than the contracted bandwidth for the application flow. When the consumed bandwidth for an application flow is significantly greater than the contracted bandwidth for the application flow, operation 320 may be performed. When the consumed bandwidth for an application flow is not significantly greater than the contracted bandwidth for the application flow, status block 322 may indicate that the consumed bandwidth may be within range of the contracted bandwidth.

Operation 320 comprises delaying transmission of the current application to reduce its resource consumption. In some embodiments, operation 320 may comprise allocating some of the bandwidth consumed by the current application to one or more other lower QoS level applications, although the scope of the invention is not limited in this respect. In some embodiments, operation 320 may be performed until the consumed bandwidth for the current application flow is no longer significantly greater than the contracted bandwidth for the current application flow.

Status block 322 may indicate that the consumed bandwidth may be within range of the contracted bandwidth indicating that the application flow is receiving and consuming sufficient bandwidth to meet its QoS requirement and that excessive bandwidth is not being consumed by the application flow.

Although the individual operations of procedure 300 are illustrated and described as separate operations, one or more of the individual operations may be performed concurrently, and nothing requires that the operations be performed in the order illustrated. Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Embodiments may be implemented in one or a combination of hardware, firmware and software. Embodiments may also be implemented as instructions stored on a computer-readable medium, which may be read and executed by at least one processor to perform the operations described herein. A computer-readable medium may include any mechanism for storing or transmitting information in a form readable by a machine (e.g., a computer). For example, a computer-readable medium may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A media access controller comprising:
a quality-of-service manager to monitor consumed bandwidth of a current application flow and to compare the consumed bandwidth with a contracted bandwidth for the current application flow; and
a contention manager to coordinate access to a wireless communication channel for communications with other nodes of a wireless mesh network,
wherein the quality-of-service manager is adapted to instruct the contention manager to request additional resources for the current application flow after the consumed bandwidth is significantly less than the contracted bandwidth, and
wherein, in response to the request for additional resources, a transmitting node receiving the request is adapted to increase a contention window for a lower quality-of-service level application flow, the transmitting node being one of the other nodes of the wireless mesh network transmitting the current application flow.

2. The media access controller of claim 1 wherein the contention manager employs signaling to request additional resources, the employed signaling including setting a flag bit in reply packets to indicate to one or more transmitting nodes to allocate greater bandwidth to the current application flow.

3. The media access controller of claim 1 wherein the contention manager is further adapted to employ signaling to instruct the transmitting node to reset the contention window after the consumed bandwidth is no longer significantly less than the contracted bandwidth.

4. The media access controller of claim 1 wherein the quality-of-service manager is adapted to terminate one or more lower quality-of-service level application flows after the consumed bandwidth remains significantly less than the contracted bandwidth for the current application flow even after the transmitting node has increased the contention window for the one or more lower quality-of-service level application flows.

5. The media access controller of claim 4 wherein the quality-of-service manager is adapted to select the one or more lower quality-of-service level application flows for termination based on an application profile, the application profile indicating a priority of an associated application flow.

6. The media access controller of claim 5 wherein the current application flow is one of a plurality of a higher quality-of-service level application flows, wherein the higher quality-of-service level application flows comprise one or more of a voice application flow or a video application flow, and wherein the one or more lower quality-of-service level application flows comprise background and best effort application flows.

7. The media access controller of claim 6 wherein the video application flow includes one or more multimedia application flows including a high-definition television application flow, a standard television application flow, and a streaming video application flow, and wherein the background and best effort application flows include one or more of an email application flow, an Internet application flow, a file transfer protocol application flow, a transmission control protocol application flow and a universal datagram protocol application flow.

8. The media access controller of claim 1 wherein the contention manager is coupled to a physical layer that communicates orthogonal frequency division multiplexed communication signals with one or more of the other nodes of the wireless mesh network, the orthogonal frequency division multiplexed communication signals comprising a plurality of substantially orthogonal subcarriers.

9. The media access controller of claim 8 wherein the mesh network is a multichannel mesh network, and wherein the physical layer is adapted to communicate with at least some of the other nodes of the mesh network with two or more orthogonal communication channels.

10. The media access controller of claim 8 wherein the physical layer is coupled to two or more antennas for transmitting two or more data streams to one or more of the other nodes of the wireless mesh network.

11. The media access controller of claim 1 wherein the contention manager performs an enhanced distributed coordinated access procedure to access the wireless communication channel, and wherein an increase in the contention window by the contention manager increases a back-off time for transmissions by a physical layer to change a probability of gaining access to the channel.

12. The media access controller of claim 1 further comprising an admission controller to admit application flows to the network and provide a contracted bandwidth for each admitted application flow to the quality-of-service manager.

13. A media access controller comprising:

a quality-of-service manager to monitor consumed bandwidth of a current application flow and to compare the consumed bandwidth with a contracted bandwidth for the current application flow; and a contention manager to coordinate access to a wireless communication channel for communications with other nodes of a wireless mesh network, wherein the quality-of-service manager is adapted to instruct the contention manager to request additional resources for the current application flow after the consumed bandwidth is significantly less than the contracted bandwidth, and wherein the contention manager is responsive to requests from one or more of the other nodes of the wireless mesh network for additional resources for the current application flow, wherein the contention manager is adapted to increase a contention window for a lower quality-of-service level application flow in response to the requests.

14. A media access controller comprising:

a quality-of-service manager to monitor consumed bandwidth of a current application flow and to compare the consumed bandwidth with a contracted bandwidth for the current application flow; and a contention manager to coordinate access to a wireless communication channel for communications with other nodes of a wireless mesh network, wherein the quality-of-service manager is adapted to instruct the contention manager to request additional resources for the current application flow after the consumed bandwidth is significantly less than the contracted bandwidth, and wherein the quality-of-service manager is further adapted to instruct the contention manager to either allocate additional bandwidth to lower quality-of-service level application flows or delay transmissions of the current application flow after the consumed bandwidth is significantly greater than the contracted bandwidth.

15. The media access controller of claim 14 wherein the contention manager is adapted to increase a contention window for the current application flow to delay transmissions of the current application flow after the consumed bandwidth is significantly greater than the contracted bandwidth.

16. A method for managing application flows comprising:

monitoring consumed bandwidth of a current application flow in a wireless mesh network;

comparing the consumed bandwidth with a contracted bandwidth for the current application flow; and requesting additional resources for the current application flow after the consumed bandwidth is significantly less than the contracted bandwidth, wherein the monitoring, comparing and requesting are performed by a current node of the wireless mesh network, and wherein in response to the request for additional resources, a transmitting node receiving the request increases a contention window for a lower quality-of-service level application flow, the transmitting node being another node of the wireless mesh network transmitting the current application flow.

17. The method of claim 16 wherein requesting includes setting a flag bit in reply packets to indicate to one or more transmitting nodes to allocate greater bandwidth to the current application flow.

18. The method of claim 16 wherein requesting includes employing signaling to instruct the transmitting node to reset the contention window after the consumed bandwidth is no longer significantly less than the contracted bandwidth.

19. The method of claim 16 further comprising terminating one or more lower quality-of-service level application flows after the consumed bandwidth remains significantly less than the contracted bandwidth for the current application flow even after the transmitting node has increased the contention window for the one or more lower quality-of-service level application flows.

20. The method of claim 19 further comprising selecting one or more of the lower quality-of-service level application flows for termination based a priority of an associated application flow.

21. The method of claim 20 wherein the current application flow is one of a plurality of a higher quality-of-service level application flows, wherein the higher quality-of-service level application flows comprise one or more of a voice application flow or a video application flow, and wherein the one or more lower quality-of-service level application flows comprise background and best effort application flows.

22. The method of claim 21 wherein the video application flow includes one or more multimedia application flows including a high-definition television application flow, a standard television application flow, and a streaming video application flow, and
  wherein the background and best effort application flows include one or more of an email application flow, an Internet application flow, a file transfer protocol application flow, a transmission control protocol application flow and a universal datagram protocol application flow.

23. The method of claim 16 further comprising communicating orthogonal frequency division multiplexed communication signals with one or more of the other nodes of the wireless mesh network, the orthogonal frequency division multiplexed communication signals comprising a plurality of substantially orthogonal subcarriers.

24. The method of claim 23 wherein the mesh network is a multichannel mesh network, and
  wherein communicating comprises communicating with at least some of the other nodes of the mesh network with two or more orthogonal communication channels.

25. The method of claim 23 further comprising transmitting two or more data streams with two or more antennas to one or more of the other nodes of the wireless mesh network.

26. The method of claim 16 further comprising performing an enhanced distributed coordinated access procedure to access the wireless communication channel, and
  wherein an increase in the contention window increases a back-off time for transmissions to change a probability of gaining access to the channel.

27. A method for managing application flows comprising:
  monitoring consumed bandwidth of a current application flow in a wireless mesh network;
  comparing the consumed bandwidth with a contracted bandwidth for the current application flow;
  requesting additional resources for the current application flow after the consumed bandwidth is significantly less than the contracted bandwidth; and
  responding to requests from one or more nodes of the wireless mesh network for additional resources for the current application flow by increasing a contention window for a lower quality-of-service level application flow in response to the requests.

28. A method for managing application flows comprising:
  monitoring consumed bandwidth of a current application flow in a wireless mesh network;
  comparing the consumed bandwidth with a contracted bandwidth for the current application flow;
  requesting additional resources for the current application flow after the consumed bandwidth is significantly less than the contracted bandwidth and
  either allocating additional bandwidth to lower quality-of-service level application flows or delaying transmissions of the current application flow after the consumed bandwidth is significantly greater than the contracted bandwidth.

29. The method of claim 28 further comprising increasing a contention window for the current application flow to delay transmissions of the current application flow after the consumed bandwidth is significantly greater than the contracted bandwidth.

30. A method for managing application flows comprising:
  monitoring consumed bandwidth of a current application flow in a wireless mesh network;
  comparing the consumed bandwidth with a contracted bandwidth for the current application flow;
  requesting additional resources for the current application flow after the consumed bandwidth is significantly less than the contracted bandwidth;
  admitting application flows to the network; and
  providing a contracted bandwidth for each admitted application flow for use in comparing with the consumed bandwidth for each admitted application flow.

31. A wireless router comprising:
  a media access controller; and
  a physical layer for communicating with other nodes of a wireless mesh network,
  wherein the media access controller comprises:
  a quality-of-service manager to monitor consumed bandwidth of a current application flow and to compare the consumed bandwidth with a contracted bandwidth for the current application flow; and
  a contention manager to coordinate access to a wireless communication channel for communications with other nodes of the network,
  wherein the quality-of-service manager is adapted to instruct the contention manager to request additional resources for the current application flow after the consumed bandwidth is significantly less than the contracted bandwidth, and
  wherein, in response to the request for additional resources, a transmitting node receiving the request is adapted to increase a contention window for a lower quality-of-service level application flow, the transmitting node being one of the other nodes of the wireless mesh network transmitting the current application flow.

32. The router of claim 31 wherein the contention manager is further adapted to employ signaling to instruct the transmitting node to reset the contention window after the consumed bandwidth is no longer significantly less than the contracted bandwidth.

33. A wireless router comprising:
  a media access controller; and
  a physical layer for communicating with other nodes of a wireless mesh network,
  wherein the media access controller comprises:
  a quality-of-service manager to monitor consumed bandwidth of a current application flow and to compare the consumed bandwidth with a contracted bandwidth for the current application flow; and
  a contention manager to coordinate access to a wireless communication channel for communications with other nodes of the network,
  wherein the quality-of-service manager is adapted to instruct the contention manager to request additional resources for the current application flow after the consumed bandwidth is significantly less than the contracted bandwidth, and
  wherein the contention manager is responsive to requests from one or more of the other nodes of the wireless mesh network for additional resources for the current application flow, wherein the contention manager is adapted to increase a contention window for a lower quality-of-service level application flow in response to the requests.

34. A system comprising:
  one or more substantially omnidirectional antennas;
  a media access controller; and
  a physical layer for communicating with other nodes of a wireless mesh network using the one or more antennas,
  wherein the media access controller comprises:
  a quality-of-service manager to monitor consumed bandwidth of a current application flow and to compare the consumed bandwidth with a contracted bandwidth for the current application flow; and a contention manager to coordinate access to a wireless communication channel for communications with other nodes of the network, wherein the quality-of-service manager is adapted to instruct the contention manager to request additional resources for the current application flow after the consumed bandwidth is significantly less than the contracted bandwidth, and wherein, in response to the request for additional resources, a transmitting node receiving the request is adapted to increase a contention window for a lower quality-of-service level application flow, the transmitting node being one of the other nodes of the wireless mesh network transmitting the current application flow.

35. The system of claim 34 wherein the contention manager is further adapted to employ signaling to instruct the transmitting node to reset the contention window after the consumed bandwidth is no longer significantly less than the contracted bandwidth.

36. A system comprising:
one or more substantially omnidirectional antennas;
a media access controller; and
a physical layer for communicating with other nodes of a wireless mesh network using the one or more antennas,
wherein the media access controller comprises:
a quality-of-service manager to monitor consumed bandwidth of a current application flow and to compare the consumed bandwidth with a contracted bandwidth for the current application flow; and
a contention manager to coordinate access to a wireless communication channel for communications with other nodes of the network,
wherein the quality-of-service manager is adapted to instruct the contention manager to request additional resources for the current application flow after the consumed bandwidth is significantly less than the contracted bandwidth,
wherein the contention manager is responsive to requests from one or more of the other nodes of the wireless mesh network for additional resources for the current application flow, and
wherein the contention manager is adapted to increase a contention window for a lower quality-of-service level application flow in response to the requests.

37. A computer-accessible medium that stores instructions for execution by one or more processors to perform operations comprising:
monitoring consumed bandwidth of a current application flow in a wireless mesh network;
comparing the consumed bandwidth with a contracted bandwidth for the current application flow; and
requesting additional resources for the current application flow after the consumed bandwidth is significantly less than the contracted bandwidth, wherein in response to the request for additional resources, a transmitting node receiving the request increases a contention window for a lower quality-of-service level application flow, the transmitting node being another node of the wireless mesh network transmitting the current application flow.

38. The computer-accessible medium of claim 37 wherein requesting includes employing signaling to instruct the transmitting node to reset the contention window after the consumed bandwidth is no longer significantly less than the contracted bandwidth.

39. A computer-accessible medium that stores instructions for execution by one or more processors to perform operations comprising:
monitoring consumed bandwidth of a current application flow in a wireless mesh network;
comparing the consumed bandwidth with a contracted bandwidth for the current application flow:
requesting additional resources for the current application flow after the consumed bandwidth is significantly less than the contracted bandwidth; and
responding to requests from one or more other nodes of the wireless mesh network for additional resources for the current application flow by increasing a contention window for a lower quality-of-service level application flow in response to the requests.

* * * * *

UNITED STATES PATENT AND TRADEMARK OFFICE
CERTIFICATE OF CORRECTION

PATENT NO.        : 7,515,608 B2                                  Page 1 of 1
APPLICATION NO.   : 11/030601
DATED             : April 7, 2009
INVENTOR(S)       : Yuan et al.

It is certified that error appears in the above-identified patent and that said Letters Patent is hereby corrected as shown below:

In column 10, line 39, in Claim 17, delete "selling" and insert -- setting --, therefor.

In column 11, line 49, in Claim 28, delete "bandwidth" and insert -- bandwidth; --, therefor.

In column 14, line 31, in Claim 39, delete "flow:" and insert -- flow; --, therefor.

Signed and Sealed this

Sixteenth Day of June, 2009

JOHN DOLL
*Acting Director of the United States Patent and Trademark Office*